US007285140B2

(12) United States Patent
Valentine

(10) Patent No.: US 7,285,140 B2
(45) Date of Patent: *Oct. 23, 2007

(54) LOW-EMISSIONS DIESEL FUEL BLEND

(75) Inventor: James M. Valentine, Fairfield, CT (US)

(73) Assignee: Clean Diesel Technologies, Inc., Stamford, CT (US)

( * ) Notice: Subject to any disclaimer, the term of this patent is extended or adjusted under 35 U.S.C. 154(b) by 388 days.

This patent is subject to a terminal disclaimer.

(21) Appl. No.: 10/357,027

(22) Filed: Feb. 3, 2003

(65) Prior Publication Data

US 2007/0209272 A1    Sep. 13, 2007

Related U.S. Application Data

(60) Provisional application No. 60/222,252, filed on Aug. 1, 2000.

(51) Int. Cl.
*C10L 1/18* (2006.01)
(52) U.S. Cl. .................. 44/388; 44/308; 44/389; 44/358; 44/363; 44/364
(58) Field of Classification Search .............. 44/308, 44/388, 389, 358, 363, 364
See application file for complete search history.

(56) References Cited

U.S. PATENT DOCUMENTS 4,364,743 A * 12/1982 Erner .................... 44/388
5,336,476 A * 8/1994 Kintaichi et al. ........ 423/239.1
5,520,708 A * 5/1996 Johnson et al. ............. 44/388
5,853,679 A * 12/1998 Tabata et al. ............ 423/213.2
6,468,319 B1 * 10/2002 Yeh et al. .................. 44/388

* cited by examiner

Primary Examiner—Cephia D. Toomer
(74) Attorney, Agent, or Firm—Thaddius J. Carvis

(57) ABSTRACT

A low-emissions diesel fuel comprises a catalyzed blend of fatty acid esters, preferably derived from soybean oil and/or tallow and aviation kerosene. The catalyzed blend is effective in lowering regulated emission pollutants, among which are $NO_x$, particulates, hydrocarbons and carbon monoxide. The catalyst will comprise fuel-soluble platinum and/or cerium or iron. The cerium or iron are typically employed at concentrations of from 2 to 25 ppm and the platinum from 0.05 to 2 ppm, with preferred levels of cerium or iron being from 5 to 10 ppm, e.g., 7.5 ppm, and the platinum being employed at a level of from 0.1 to 0.5 ppm, e.g., 0.15 ppm. A preferred ratio of cerium and/or iron to platinum is from 75:1 to 10:1. The jet fuel component will typically be employed at a volume ratio to the fatty acid esters of from about 2:1 to about 5:1, e.g., about 4:1. The full range of blends extends from 50:1 to 1:50 with some benefit. The jet fuel component of the blend preferably contains grade 55, 50-300 ppm detergent, 25 to about 500 ppm lubricity additive and 0.1-1 ppm platinum COD and 5-20 ppm cerium oleate or octoate. In addition to the fuel blend, a method is provided for reducing the emissions of pollutants from a diesel engine, comprising running the engine on a fuel as defined.

16 Claims, No Drawings

LOW-EMISSIONS DIESEL FUEL BLEND

PRIORITY CLAIM

This application claims priority to PCT Application Serial No. PCT/US01/24061, filed Aug. 1, 2001, which in turn claims priority to U.S. Provisional Application Ser. No. 60/222,252, filed Aug. 1, 2000.

BACKGROUND OF THE INVENTION

The invention concerns a new catalyzed low-emissions diesel fuel blend based on a biologically-derived stock and a base fuel designed for use in jet engines and modified for use in diesel engines, especially fuels suitable to power buses in metropolitan areas where emissions are of special concern.

Efforts are being made in many jurisdictions to reduce the emissions of regulated pollutants like carbon monoxide, nitrogen oxides ($NO_x$) and particulates. The technologies have included those that modify the combustion conditions and fuels, known as primary measures, and those that treat the exhaust after combustion, known as secondary measures. Normally, $NO_x$ tends to increase as primary measures are employed to reduce particulates. The opposite is also true.

There is a need for a new low-emissions fuel for use in diesel engines to reduce emissions of one or more regulated pollutants which can also be used alone or in conjunction with secondary measures.

Especially, it would be desirable to have fuel that would simultaneously reduce $NO_x$ and particulates as compared to standard diesel fuel.

It would also be desirable to provide a new low-emissions fuel effective as a primary measure, to be employed along with secondary measures to achieve further emission reductions, wherein the combination would be better because the secondary measures would operate from a low initial pollutant level, especially initially low levels of both $NO_x$ and particulates.

SUMMARY OF THE INVENTION

The invention provides a new catalyzed low-emissions fuel blend for use in diesel engines and a method of reducing pollutant emissions from diesel engines. The diesel fuel of the invention and its use in diesel engines is described below.

The low-emissions diesel fuel of the invention comprises a catalyzed blend of a biologically-derived fuel comprising a "mono-alkyl ester-based oxygenated fuel", i.e., fatty acid esters, preferably methyl esters of fatty acids derived from triglycerides, e.g., soybean oil, Canola oil and/or tallow, and a jet aviation kerosene. The catalyzed blend is effective in lowering regulated emission pollutants, among which are $NO_x$, particulates, hydrocarbons and carbon monoxide. Preferably the fuel will lower $NO_x$ and particulates at the same time, an unusual combination. Preferred blends will be effective to achieve a 5% or more reduction in $NO_x$ and a particulate reduction of at least 25% as compared to a baseline of No. 2 Diesel fuel. More preferred levels will be from 6 to 10% $NO_x$ reduction and from 30 to 50% particulate reduction. Higher reductions of particulates can be achieved by using the fuel in an engine equipped with a diesel particulate filter or diesel oxidation catalyst.

The catalyst will comprise fuel-soluble platinum and/or cerium or iron. The cerium or iron are typically employed at concentrations of from 2 to 25 ppm and the platinum from 0.05 to 2 ppm, with preferred levels of cerium or iron being from 5 to 10 ppm, e.g., 7.5 ppm, and the platinum being employed at a level of from 0.1 to 0.5 ppm, e.g., 0.15 ppm. A preferred ratio of cerium and/or iron to platinum is from 75:1 to 10:1. One narrower range is from 60:1 to 25:1.

The jet fuel component of the fuel will typically be employed at a volume ratio to the fatty acid esters of from about 2:1 to about 5:1, e.g., about 4:1. The full range of blends extends from 50:1 to 1:50 with some benefit. The jet fuel component of the blend preferably contains grade 55, 50-300 ppm detergent, 25 to about 500 ppm lubricity additive and 0.1-2 ppm fuel soluble platinum group metal composition, e.g., platinum COD and/or 2-20 ppm fuel soluble cerium or iron composition, e.g., cerium, cerium octoate, ferrocene, iron oleate, iron octoate and the like. In addition to the fuel blend, a method is provided for reducing the emissions of pollutants from a diesel engine, comprising running the engine on a fuel as defined. If desired, the combination of a blend of fatty acid esters and aviation kerosene can be employed to good effect without a fuel borne catalyst.

Many of the preferred aspects of the invention are described below. Equivalent compositions are contemplated.

DESCRIPTION OF THE INVENTION

The invention provides a new diesel fuel comprised of a blend of a biologically-derived fuel and a jet fuel, catalyzed with platinum and/or cerium or iron. In addition to the noted blend, the fuel can contain a lubricity additive and a detergent.

One component of the fuel comprises a commercially-available jet fuel. It can be purchased from Colonial Pipeline Company as "fungible aviation kerosene grade 55". Equivalents which have the same essential function and those varying compositionally by up to 15%, preferably by less than 5%, can also be employed. It is characterized by the following average analysis:

| Parameter | ASTM Test Method | Value |
| --- | --- | --- |
| Cetane Number | D-613 | 50.4 |
| Hydrocarbon | D-1319 | |
| Aromatics, vol % | | 15.3 |
| Olefins, vol % | | 1.8 |
| Saturates, vol % | | 82.9 |
| Flash Point (° F.) | D-93 | 138 |
| API Gravity | D-4052 | 44.4 |
| Specific Gravity | | 0.8045 |
| Viscosity, 40° C. (cSt) | D-445 | 1.46 |
| Sulfur (weight %) | D-2622 | 0.0334 |
| ppm | | 334[1] |
| Heat of Combustion, | | |
| Gross (BTU/Pound) | D-240 | 19,794.7 |
| Net (BTU/Pound) | | 18,519.4 |
| Pour Point (° C.) | D-97 | −48 |
| Cloud Point (° C.) | D-2500 | −45 |
| Cetane Index (calculated) | D-976 | 42 minimum, 48 test |

[1]Lower sulfur forms of this formulation, as low as 5 to 30 ppm sulfur, can provide further advantages and are included.

This preferred jet fuel for use in the blend will show the following properties when subjected to a simulated distillation as set out in ASTM D-2887.

| Simulated Distillation (° C.) | D-2887 |
|---|---|
| IBP | 119.7 |
| 5 | 156.7 |
| 10 | 167.2 |
| 15 | 173.8 |
| 20 | 180.8 |
| 30 | 194.3 |
| 40 | 203.6 |
| 50 | 215.3 |
| 60 | 226.2 |
| 70 | 235.7 |
| 80 | 250.2 |
| 90 | 265.1 |
| 95 | 276.3 |
| FBP | 304.7 |

The other principal ingredient of the low-emissions diesel fuel of the invention comprises a biologically-derived fuel component comprised of a "mono-alkyl ester-based oxygenated fuel", i.e., fatty acid esters, preferably from fatty acids derived from triglycerides such as soybean oil, Canola oil and/or tallow, and aviation kerosene. As used herein, the term "fatty acid ester(s)" is intended to include any compound wherein the alcohol portion is easily removed, including polyols and substituted alcohols, etc., but are preferably esters of volatile alcohols, e.g., the $C_1$-$C_4$ alcohols (preferably methyl), 2-methoxy ethyl and benzyl esters of fatty acids containing about eight or more (e.g., 8 to 22) carbon atoms, and mixtures of such esters. Volatile alcohols are highly desirable. Methyl esters are the most highly preferred ester reactants. Suitable ester reactants can be prepared by the reaction of diazoalkanes and fatty acids, or derived by alcoholysis from the fatty acids naturally occurring in fats and oils.

Suitable fatty acid esters can be derived from either synthetic or natural, saturated or unsaturated fatty acids and include positional and geometrical isomers. Suitable preferred saturated fatty acids include caprylic, capric, lauric, myristic, palmitic, stearic, arachidic, behenic, isomyristic, isomargaric, myristic, caprylic, and anteisoarachadic. Suitable preferred unsaturated fatty acids include myristoleic, palmitoleic, ricinoleic, linoleic, oleic, elaidic, linolenic, eleasteric, arachidonic, erucic, and erythrogenic acids. Mixtures of fatty acids derived from soybean oil, palm oil, safflower oil, rapeseed oil, Canola (low erucic acid), and corn oil are especially preferred for use herein. The fatty acids can be used "as is," and/or after hydrogenation, and/for isomerization, and/for purification. For example, rapeseed provides a good source for $C_{22}$ fatty acids; $C_{16}$-$C_{18}$ fatty acids can be provided by tallow, soybean oil, or cottonseed oil, and shorter chain fatty acids can be provided by coconut, palm kernel, or babassu oils. Lard, olive oil, peanut oil, sesame seed oil, and sunflower seed oil, are other natural sources of fatty acids.

Preferred esters are lower alkyl esters, e.g., methyl, ethyl, propyl and butyl, particularly methyl esters of soybean and or tallow fatty acids. One product of this type is available under the trademark BioDiesel by Members of the National BioDiesel Board (www.biodiesel.org) and is identified as "Methyl Soyate, Rapeseed Methyl Ester (RME), Methyl Tallowate". The manufacturer also refers to the fuel as "a mono-alkyl ester-based oxygenated fuel, a fuel made from vegetable oil or animal fats." It is said to contain 11% oxygen by weight. They describe the product as Methyl esters from lipid sources, CAS Number 67784-80-9.

The catalyst will comprise fuel-soluble platinum and/or cerium and/or iron. The cerium and/or iron are typically employed at concentrations of from 2 to 25 ppm and the platinum from 0.05 to 2 ppm, with preferred levels of cerium or iron being from 5 to 10 ppm, e.g., 7.5 ppm, and the platinum being employed at a level of from 0.1 to 0.5 ppm, e.g., 0.15 ppm. A preferred ratio of cerium and/or iron to platinum is from 75:1 to 10:1. The jet fuel component will typically be employed at a volume ratio to the fatty acid esters of from about 2:1 to about 5:1, e.g., about 4:1. The full range of blends extends from 50:1 to 1:50 with some benefit. The jet fuel component of the blend preferably contains grade 55, 50-1500 ppm detergent, up to about 500 ppm lubricity additive and 0.1-1 ppm platinum COD and 5-20 ppm cerium oleate or octoate. It is an advantage of the invention that the fatty acid esters add lubricity to the jet fuel and decrease the need for independent lubricity additives.

The catalyzed blend of the invention is effective in lowering regulated emission pollutants, among which are $NO_x$, particulates, hydrocarbons and carbon monoxide. Preferably the fuel will lower $NO_x$ and particulates at the same time, an unusual combination. Preferred blends will be effective to achieve a 5% or more reduction in $NO_x$ and a particulate reduction of at least 25% as compared to a baseline of No. 2 Diesel fuel. More preferred levels will be from 6 to 10% $NO_x$ reduction and from 30 to 50% particulate reduction. Higher reductions of particulates can be achieved by using the fuel in an engine equipped with a diesel particulate filter or diesel oxidation catalyst.

A preferred detergent, which can be employed, comprises polyolefin amide alkyleneamine (about 65-80%) and the remainder petroleum distillate. Equivalents which have the same essential function can also be employed. One preferred form is available from Texaco as TFA-4690-C, at concentrations of from about 50 to 300 ppm, more narrowly 75-150, e.g., about 100 ppm, for which they provide the following analysis:

| Properties | Method | Typical |
|---|---|---|
| Density @ 15° C. | D4052 | 0.91–0.94 |
| Nitrogen Content, wt. % | D5291 | 2.3-2.4 |
| Flash, ° C., minimum | D93 | 62 |
| TBN, mgKOH/g | D2896 | 50-60 |
| Kinematic Viscosity, cSt at 40° C. | D445 | 600-850 |

A preferred lubricity additive, which can be employed, comprises tall oil fatty acids, available commercially as a mixture of fatty acids including oleic, linoleic and the like. Equivalents which have the same essential function can also be employed. One preferred form is available from Texaco as TFA-4769, at concentrations of from about 25 to 500 ppm, e.g., about 150-250 ppm, for which they provide the following analysis:

| Properties | Method | Typical |
|---|---|---|
| Specific Gravity, 60/60° F. | D1298 | 0.91 |
| Pounds/Gallon, 60° F. | Calculated | 7.54 |
| Flash, ° F., minimum | D93 | 142 |
| Kinematic Viscosity, cSt at 40° C. | D445 | 17.85 |

Among the specific cerium compounds are: cerium III acetylacetonate, cerium III napthenate, and cerium octoate, cerium oleate and other soaps such as stearate, neodecanoate, and octoate (2-ethylhexoate). Many of the cerium compounds are trivalent compounds meeting the formula: Ce (OOCR)$_3$ wherein R=hydrocarbon, preferably C$_2$ to C$_{22}$, and including aliphatic, alicyclic, aryl and alkylaryl. The cerium is preferred at concentrations of 2 to 15 ppm cerium w/v of fuel. Preferably, the cerium is supplied as cerium hydroxy oleate propionate complex (40% cerium by weight). Preferred levels are toward the lower end of this range.

Among the specific iron compounds are: ferrocene, ferric and ferrous acetyl-acetonates, iron soaps like octoate and stearate (commercially available as Fe(III) compounds, usually), iron pentacarbonyl Fe(CO).sub.5, iron napthenate, and iron tallate.

Any of the platinum group metal compositions, e.g., 1,5-cyclooctadiene platinum diphenyl (platinum COD), described in U.S. Pat. No. 4,891,050 to Bowers, et al., U.S. Pat. No. 5,034,020 to Epperly, et al., and U.S. Pat. No. 5,266,093 to Peter-Hoblyn, et al., can be employed as the platinum source. Other suitable platinum group metal catalyst compositions include commercially-available or easily-synthesized platinum group metal acetylacetonates, platinum group metal dibenzylidene acetonates, and fatty acid soaps of tetramine platinum metal complexes, e.g., tetramine platinum oleate. The platinum is preferred at concentrations of 0.1-2.0 ppm platinum w/v (mg per liter) of fuel, e.g., up to about 1.0 ppm. Preferred levels are toward the lower end of this range, e.g., 0.15-0.5 ppm. Platinum COD is the preferred form of platinum for addition to the fuel. The cerium or iron are typically employed at concentrations to provide from 2 to 25 ppm of the metal and the platinum from 0.05 to 2 ppm, with preferred levels of cerium or iron being from 5 to 10 ppm, e.g., 7.5 ppm, and the platinum being employed at a level of from 0.1 to 0.5 ppm, e.g., 0.15 ppm. A preferred ratio of cerium and/or iron to platinum is from 75:1 to 10:1.

In addition to utilizing the low-emissions fuel according to the invention, retarding engine timing, e.g., from 2 to 6°, can further reduce NO$_x$ and the use of a diesel particulate filter and/or diesel oxidation catalyst can provide further reductions in carbon monoxide, unburned hydrocarbons and particulates.

The low-emissions fuel according to the invention can be employed as an emulsion with water, wherein an oil phase is emulsified with water, the water comprising from 1 to 30% water based on the weight of the aviation kerosene. In the preferred forms, the emulsion will be predominantly of the water-in-oil type and will preferably contain surfactants, lubricity additives and/or corrosion inhibitors in addition to the other components mentioned above. A discussion of suitable emulsion forms and additives is found in U.S. Pat. No. 5,743,922. An emulsion of the water-in-oil type typically provides about 1% NO$_x$ reduction for each 1% water added. The combination of technologies will provide emissions reductions greater than either alone. The platinum/cerium fuel borne catalyst or other catalyst is preferred but optional. If desired, the combination of a blend of fatty acid esters and aviation kerosene can be employed to good effect without the fuel borne catalyst. The fuel thus formed in any of the embodiments above, can be used with timing changes, EGR, oxidation catalysts or particulate filters for enhanced emissions control.

The term "diesel particulate filter" is meant to refer to those devices known in the art as exhaust gas filters that reduce particulate emissions by trapping a portion of the particulates within a complex internal structure. They must be regenerated or replaced as deposits will accumulate. The fuel borne catalyst described above, when used with the base fuel as also described—forming the fuel of the invention—enables very reduced emissions with enhanced filter operation.

The term "diesel oxidation catalyst" is meant to refer to those devices known in the art as exhaust gas treatment catalysts that reduce particulate, hydrocarbon and carbon monoxide emissions by causing contact with catalyzed surfaces in lieu of trapping particulates as done in the diesel particulate filters. The fuel borne catalyst described above, when used with the base fuel as also described—forming the fuel of the invention—enables very reduced emissions with enhanced oxidation catalyst operation.

Retarding engine timing, e.g., by from about 2 to about 6°, is a known procedure for reducing NO$_x$, unfortunately it will by itself cause pollutant generation due to poor combustion. This tradeoff has been troubling the art since emissions control became important. It is an advantage of the invention, that both reduced NO$_x$ and other pollutants can be achieved by employing the fuel of the invention in combination with one or more of the above techniques and/or exhaust gas recirculation wherein a portion of the exhaust gas is intermixed with combustion air.

The above description is intended to enable the person skilled in the art to practice the invention. It is not intended to detail all of the possible modifications and variations which will become apparent to the skilled worker upon reading the description. It is intended, however, that all such modifications and variations be included within the scope of the invention which is seen in the above description and otherwise defined by the following claims. The claims are meant to cover the indicated elements and steps in any arrangement or sequence which is effective to meet the objectives intended for the invention, unless the context specifically indicates the contrary.

The invention claimed is:

1. A low-emissions diesel fuel effective in lowering one or more regulated emission pollutants, among which are NO$_x$, particulates, hydrocarbons and carbon monoxide, the fuel comprising a blend of fatty acid esters and aviation kerosene and being catalyzed with a catalyst component comprising fuel-soluble platinum and/or cerium and/or iron, wherein the cerium or iron, when employed, are present at concentrations of from 2 to 25 ppm and the platinum, when employed, is present at concentrations of from 0.05 to 2 ppm.

2. A low-emissions diesel fuel according to claim 1 wherein the fuel is effective in simultaneously reducing both NO$_x$ and particulates.

3. A low-emissions diesel fuel according to claim 1 wherein the fuel is effective in reducing NO$_x$ by at least 5% as compared to a baseline of No. 2 Diesel fuel.

4. A low-emissions diesel fuel according to claim 1 wherein the fuel is effective in reducing particulates by at least 25% as compared to a baseline of No. 2 Diesel fuel.

5. A low-emissions diesel fuel according to claim 1 wherein the fatty acid esters are derived from soybean oil and/or tallow.

6. A low-emissions diesel fuel effective in lowering one or more regulated emission pollutants, among which are NO$_x$, particulates, hydrocarbons and carbon monoxide, the fuel comprising a blend of fatty acid esters and aviation kerosene and being catalyzed with a catalyst component comprising fuel-soluble platinum and/or cerium and/or iron, wherein the levels of cerium or iron, when employed, are from 5 to 10 ppm and the platinum, when employed, is present—at a level of from 0.1 to 0.5 ppm.

7. A low-emissions diesel fuel effective in lowering one or more regulated emission pollutants, among which are $NO_x$, particulates, hydrocarbons and carbon monoxide, the fuel comprising a blend of fatty acid esters and aviation kerosene and being catalyzed with a catalyst component comprising fuel-soluble platinum and/or cerium and/or iron, wherein the ratio of cerium and/or iron, when employed, to platinum, when employed, is from 75:1 to 10:1.

8. A low-emissions diesel fuel according to claim 7 wherein the aviation kerosene component is employed at a volume ratio to the fatty acid esters of from about 2:1 to about 5:1.

9. A low-emissions diesel fuel according to claim 8 wherein the aviation kerosene component is employed at a volume ratio to the fatty acid esters of 4:1.

10. A low-emissions diesel fuel effective in lowering one or more regulated emission pollutants, among which are $NO_x$, particulates, hydrocarbons and carbon monoxide, the fuel comprising a blend of fatty acid esters and aviation kerosene and being catalyzed with a catalyst component comprising fuel-soluble platinum and/or cerium and/or iron, wherein the levels of cerium or iron, when employed, are from 5 to 10 ppm and the platinum, when employed, is present at a level of from 0.1 to 0.5 ppm, and the fuel is effective in reducing $NO_x$ by at least 5% and particulates by at least 25% as compared to a baseline of No. 2 Diesel fuel.

11. A low-emissions diesel fuel according to claim 10 wherein the aviation kerosene component is employed at a volume ratio to the fatty acid esters of from about 2:1 to about 5:1.

12. A low-emissions diesel fuel effective in simultaneously lowering $NO_x$ by at least 5% and particulates by at least 25% as compared to a baseline of No. 2 Diesel fuel, the fuel comprising a blend of fatty acid esters derived from soybean oil and/or tallow and aviation kerosene, at a volume ratio of the aviation kerosene to the fatty acid esters of from about 2:1 to about 5:1, and the fuel being catalyzed with a catalyst component comprising a fuel-soluble platinum composition at a level of at least about 0.1 ppm wherein the fuel further comprises cerium or iron at a level of from 5 to 10 ppm.

13. A low-emissions diesel fuel according to claim 12 containing a platinum catalyst and a cerium or iron catalyst wherein the ratio of cerium and/or iron, when present, to platinum is from 75:1 to 10:1.

14. A method of reducing the emissions of pollutants from a diesel engine, comprising running the engine on a fuel as defined in claim 7, wherein the cerium or iron are employed at concentrations of from 2 to 25 ppm and the platinum from 0.05 to 2 ppm.

15. A method of reducing the emissions of pollutants from a diesel engine according to claim 14, wherein the fatty acid esters are derived from soybean oil and/or tallow.

16. A method of reducing the emissions of pollutants from a diesel engine according to claim 14, wherein the aviation kerosene component is employed at a volume ratio to the fatty acid esters of from about 2:1 to about 5:1.

* * * * *